(12) United States Patent
Schumacher

(10) Patent No.: US 11,517,843 B2
(45) Date of Patent: Dec. 6, 2022

(54) FILTER ELEMENT FOR AN AIR FILTER OF A MOTOR VEHICLE AND AIR FILTER

(71) Applicant: Daimler AG, Stuttgart (DE)

(72) Inventor: Eric Schumacher, Stuttgart (DE)

(73) Assignee: Daimler AG, Stuttgart (DE)

( * ) Notice: Subject to any disclaimer, the term of this patent is extended or adjusted under 35 U.S.C. 154(b) by 293 days.

(21) Appl. No.: 16/637,555

(22) PCT Filed: Jun. 22, 2018

(86) PCT No.: PCT/EP2018/066700
§ 371 (c)(1),
(2) Date: Feb. 7, 2020

(87) PCT Pub. No.: WO2019/029888
PCT Pub. Date: Feb. 14, 2019

(65) Prior Publication Data
US 2020/0230540 A1    Jul. 23, 2020

(30) Foreign Application Priority Data

Aug. 8, 2017 (DE) ...................... 10 2017 007 498.4

(51) Int. Cl.
*B01D 46/00* (2022.01)
*B01D 46/52* (2006.01)
(Continued)

(52) U.S. Cl.
CPC .......... *B01D 46/521* (2013.01); *B01D 46/10* (2013.01); *B01D 46/0004* (2013.01);
(Continued)

(58) Field of Classification Search
CPC ................ B01D 46/10; B01D 46/0002; B01D 46/0004; B01D 46/0005; B01D 46/0006;
(Continued)

(56) References Cited

U.S. PATENT DOCUMENTS 4,002,443 A * 1/1977 Lorenz ................ B60H 3/0616
55/357
4,682,993 A * 7/1987 Todd .................. B01D 46/0002
210/235

(Continued)

FOREIGN PATENT DOCUMENTS

CN    101405067 A    4/2009
CN    106132506 A    11/2016
(Continued)

OTHER PUBLICATIONS

PCT/EP2018/066700, International Search Report dated Oct. 2, 2018 (Three (3) pages).
(Continued)

*Primary Examiner* — Minh Chau T Pham
(74) *Attorney, Agent, or Firm* — Crowell & Moring LLP

(57) ABSTRACT

A filter element for an air filter of a motor vehicle includes a frame part which surrounds a filter material of the filter element. The filter element is insertable into a receiving space which is provided by a housing of the air filter. The filter element has a holding element which is movable from an initial position into a functional position by inserting the filter element in the receiving space. In the functional position, a fastening element can be fixed to the holding element. The fastening element is configured for securing a cover element, which is used to close an insertion opening of the receiving space, to the housing.

13 Claims, 9 Drawing Sheets

(51) Int. Cl.
*B01D 46/10* (2006.01)
*B60H 3/06* (2006.01)

(52) U.S. Cl.
CPC .... *B01D 46/0005* (2013.01); *B01D 2265/026* (2013.01); *B01D 2265/028* (2013.01); *B01D 2271/02* (2013.01); *B01D 2279/60* (2013.01); *B60H 2003/065* (2013.01)

(58) Field of Classification Search
CPC ........ B01D 2265/028; B01D 2265/029; B01D 2279/60; B60H 3/0616; F02M 35/0203; F02M 35/024
USPC ....... 55/385.3, 480, 481, 493, 357; 210/235, 210/445; 123/198 E
See application file for complete search history.

(56) References Cited

U.S. PATENT DOCUMENTS

| | | | | |
|---|---|---|---|---|
| 5,399,180 | A * | 3/1995 | Kopp | B01D 46/0006 210/445 |
| 5,679,122 | A * | 10/1997 | Moll | B01D 46/10 55/497 |
| 5,730,768 | A * | 3/1998 | Kaminaga | B01D 46/0004 55/385.3 |
| 6,174,343 | B1 * | 1/2001 | Bloomer | F02M 35/024 55/385.3 |
| 8,444,733 | B2 * | 5/2013 | Thienel | B01D 46/0005 55/480 |
| 2003/0051453 | A1 * | 3/2003 | Moreau | F02M 35/024 55/385.3 |
| 2008/0110146 | A1 * | 5/2008 | Germain | B60H 3/0616 55/385.3 |
| 2010/0257828 | A1 * | 10/2010 | Shimomura | B01D 46/0004 55/493 |
| 2012/0073252 | A1 * | 3/2012 | Lee | F02M 35/0203 55/385.3 |
| 2012/0192535 | A1 * | 8/2012 | Schrewe | B01D 46/10 55/385.3 |
| 2013/0291504 | A1 * | 11/2013 | Gorman | B01D 46/10 55/509 |
| 2014/0360929 | A1 | 12/2014 | Vargas De Avila et al. | |
| 2015/0040527 | A1 * | 2/2015 | Cho | F02M 35/0201 55/481 |

FOREIGN PATENT DOCUMENTS

| | | |
|---|---|---|
| DE | 10 2007 018 215 A1 | 10/2008 |
| DE | 10 2007 063 252 A1 | 7/2009 |
| DE | 10 2008 040 319 A1 | 1/2010 |
| DE | 10 2009 048 412 B3 | 2/2011 |
| DE | 10 2014 005 734 A1 | 11/2014 |
| DE | 10 2015 003 297 A1 | 9/2016 |
| EP | 0 620 133 A1 | 10/1994 |
| EP | 1 172 240 A2 | 1/2002 |

OTHER PUBLICATIONS

U.S. Patent Application, Connection Arrangement for Fixing a Lid of an Air Filter Device of a Motor Vehicle to a Filter Housing and to a Filter Element and an Associated Filter Element, filed Feb. 7, 2020, Inventor: Eric Schumacher.

German-language German Office Action issued in German application No. 10 2017 007 498.4 dated Dec. 17, 2020 (Seven (7) pages).

Chinese Office Action issued in Chinese application No. 201880052060.4 dated May 6, 2021, with partial English translation (Eleven (11) pages).

* cited by examiner

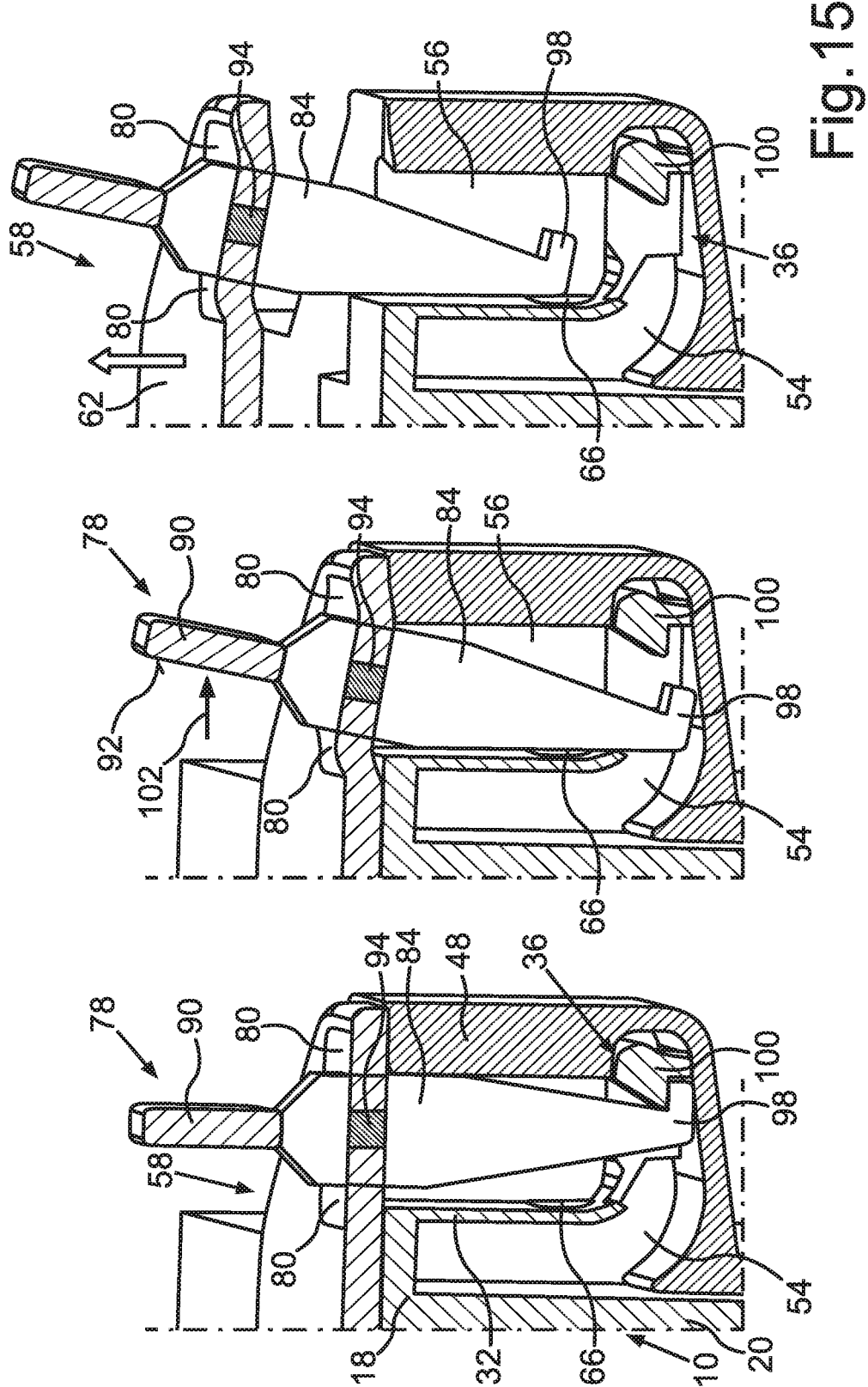

FILTER ELEMENT FOR AN AIR FILTER OF A MOTOR VEHICLE AND AIR FILTER

BACKGROUND AND SUMMARY OF THE INVENTION

The invention relates to a filter element for an air filter of a motor vehicle, having a frame part which surrounds, at least in regions, a filter material of the filter element. The filter element is installable in a receiving space, which is provided by a housing of the air filter. The invention further relates to an air filter having such a filter element.

DE 10 2007 063 252 A1 describes an insertable air filter in a climate control device of a motor vehicle. In this case, an insertable frame with an air filter is bendable about a bend axis, which is aligned parallel to the insertion plane and perpendicular to the insertion direction. The purpose of this bendability of the insertion frame is to enable the insertable air filter to be easily inserted into the climate control device, even in tight spaces or under confined conditions.

Also known from the prior art is the use of a cover to close a receiving space for a filter element of an air filter formed by a housing of the air filter. In this case the cover can be affixed by, for example, being screwed to the housing of the air filter.

However, it turns out to be difficult to check whether the filter element was installed in the housing of the air filter when an insertion opening of the receiving space is closed by means of the cover.

The object of this invention is therefore that of creating a filter element of the aforementioned type, which makes it possible to confirm easily whether the filter element was installed in the air filter even in the event of a receiving space closed by means of a cover element, and of providing an air filter having such a filter element.

The filter element according to the invention for an air filter of a motor vehicle has a frame part, which surrounds, at least in regions, a filter material of the filter element. The filter element is insertable into a receiving space, which is provided by a housing of the air filter. The filter element has at least one holding element, which is moveable from an initial position into a functional position by inserting the filter element into the receiving space. In the functional position, at least one fastening element is fastenable to the at least one holding element. The at least one fastening element is configured for securing a cover element to the housing. The cover element is used for closing an insertion opening of the receiving space. The cover element can thus be secured to the housing of the air filter for closing the insertion opening of the receiving space merely by bringing the at least one holding element into the functional position. Once the at least one holding element has been moved from the initial position into the functional position, it is thus possible to fix the at least one fastening element to the at least one holding element.

This construction of the filter element consequently makes it possible to confirm easily whether the filter element was mounted or installed in the air filter: before the cover element can be fastened to the housing, the filter element must first be introduced or inserted into the receiving space. As a result of this insertion, the at least one holding element or such a holder or such a counterpart for the fastening element provided on sides of the cover element is moved or brought from the initial position into the functional position. In other words, as a result of the insertion of the filter element into the receiving space, the at least one holding element aligns itself in such a way that the at least one fastening element can be fixed to the at least one holding element. Accordingly, the air filter is only operable with the filter element installed. This is because the cover element cannot be mounted on the housing of the air filter unless a filter element is installed in the receiving space of the air filter. Consequently, it will also be noticed if the filter element is missing.

For example, if the filter element has to be changed or replaced because the filter material of the filter element is dirty, the new filter element must be inserted into the receiving space of the air filter for mounting the cover element on the housing of the air filter. A check to determine whether the filter element was installed thus takes place in a particularly expedient fashion.

The at least one holding element is preferably held on the frame part by means of a flexible connecting strip. The at least one holding element is moveable from its initial position into its functional position by a deformation of the connecting strip. The movement of the at least one holding element from the initial position into the functional position can thus be brought about in a particularly expedient and reliable fashion by inserting the filter element into the receiving space. In particular, the flexible connecting strip can be elastically deformable if the connecting strip is configured in the manner of, for example, a film hinge. The connecting strip then automatically moves from the functional position back into the initial position if the filter element is removed from the receiving space.

The at least one holding element in the initial position preferably forms a first angle with a side wall of the frame part, the side wall extending in an insertion direction of the filter element. The filter element is insertable into the receiving space in the insertion direction. The at least one holding element in the functional position forms a second angle with the side wall, which is larger than the first angle. In other words, an imaginary median plane running through the holding element and intersecting the side wall in a line coinciding with a vertical direction of the side wall defines the first angle and the second angle, respectively, with the side wall. An easy and process-reliable insertion of the filter element into the receiving space can thus be ensured. During this introduction or insertion, the at least one holding element, guided by means of, for example, a guide mechanism, moves automatically from the initial position into the functional position. The guide mechanism is preferably provided by the housing of the air filter. Furthermore, it is thus possible for the holding element in the functional position to engage behind or encompass, in an undercutting manner, a housing part of the housing.

In particular, the at least one holding element in the functional position can be aligned substantially perpendicular to the side wall. This facilitates the fixing of the cover element to the housing of the air filter by means of the at least one fastening element.

The at least one fastening element can have a screw thread configured as a female thread. Accordingly, provision can be made of a screw bolt as the fastening element, which can then simply be screwed into the female thread if the female thread is brought into the functional position.

As an alternative, the at least one holding element can have a receptacle for at least one pin formed on the fastening element. In this manner, it is possible to provide a fastening of the cover element to the housing of the air filter in the form of a bayonet catch. The at least one pin formed on the fastening element is introduced into the receptacle by rotating a shaft part of the fastening element (according to the principle of a bayonet catch). At least one pin is arranged on the shaft part. The cover element can thus be secured to the housing in a particularly quick and reliable fashion.

As an alternative, the at least one holding element can have a latch element which is configured for a corresponding latch element of the fastening element or for cooperation with the corresponding latch element of the fastening element. The cover element can also be secured particularly easily and quickly to the housing of the air filter with this design if the at least one holding element is brought into the functional position.

The air filter according to the invention for a motor vehicle comprises a filter element according to the invention, wherein the filter element is introduced into a receiving space provided by a housing of the air filter. Fixing at least one fastening element to the at least one holding element of the filter element in turn secures a cover element to the housing. An insertion opening of the receiving space is closed by means of the cover element. The air filter can be configured in particular as an air filter of a climate control system or ventilation mechanism of the motor vehicle. The air filter can furthermore be intended for an intake manifold of an internal combustion engine of the motor vehicle.

The cover element is preferably configured as a separate closure mechanism for the receiving space, which can be removed from the insertion opening before removal of the filter element from the receiving space. In particular with such a design in which the cover element is not held on the filter element or not formed integrally with the filter element, the checking of an installation of the filter element made possible by the design of the filter element is particularly advantageous.

The housing preferably has at least one guide mechanism, wherein by introducing the at least one holding element into the at least one guide mechanism, the at least one holding element can be moved from the initial position into the functional position. For example, as the filter element is introduced into the receiving space, the at least one holding element can follow a curved contour of the guide mechanism and thus be moved from the initial position into the functional position. Providing such a guide mechanism or guide track enables the holding element to be aligned in an expedient and process-reliable manner.

It has also proved to be advantageous if the at least one holding element in the functional position engages behind a housing part of the housing. In this case a passage opening is formed in the housing part. A shaft part of the at least one fastening element is guided through the passage opening when the at least one fastening element is fixed to the at least one holding element. A particularly secure fixing of both the filter element in the receiving space and of the cover to the housing of the air filter is thus achievable.

The shaft part of the at least one fastening element can have a screw thread, which can be screwed into a holding element having a female thread in order to fix the cover element securely to the housing.

As an alternative, the shaft part can have at least one pin that can be introduced into a receptacle by turning the shaft part. A rotational locking (but configured in the form of a bayonet catch) is thus also achievable as the cover element is secured to the housing of the air filter. However, in this case the fastening element only needs to be turned slightly, for instance a quarter turn, in order to fix the cover element to the housing.

Lastly, it has proved to be advantageous if the shaft part is pivotable about a pivot axis extending perpendicularly to a longitudinal extension direction of the shaft part. By pivoting the shaft part about the pivot axis, the fastening element can be moved into a release position in which the fixation of the fastening element to the holding element is disengaged. A particularly expedient and process-reliable securing of the cover element to the housing of the air filter (and a corresponding releasing of the cover element from the housing) is also achievable by such a translational locking.

The advantages and preferred embodiments described for the filter element according to the invention likewise apply to the air filter according to the invention, and vice versa.

Further advantages, features and details of the invention emerge from the following description of a preferred embodiment and with reference to the drawings. The features and combinations of features mentioned in the description above and the features and combinations of features mentioned in the description of the Figures and/or shown alone in the Figures in the following are not only usable in each of combinations mentioned, but also in other combinations or alone without exceeding the scope of the invention.

BRIEF DESCRIPTION OF THE DRAWINGS

FIG. 15 shows in a partially cut detail view, the steps in the releasing of the cover element according to FIG. 13 from the housing according to FIG. 2, wherein a holding element formed on the filter element according to FIG. 1 comprises a latching lug.

DETAILED DESCRIPTION OF THE DRAWINGS

Figure 1:
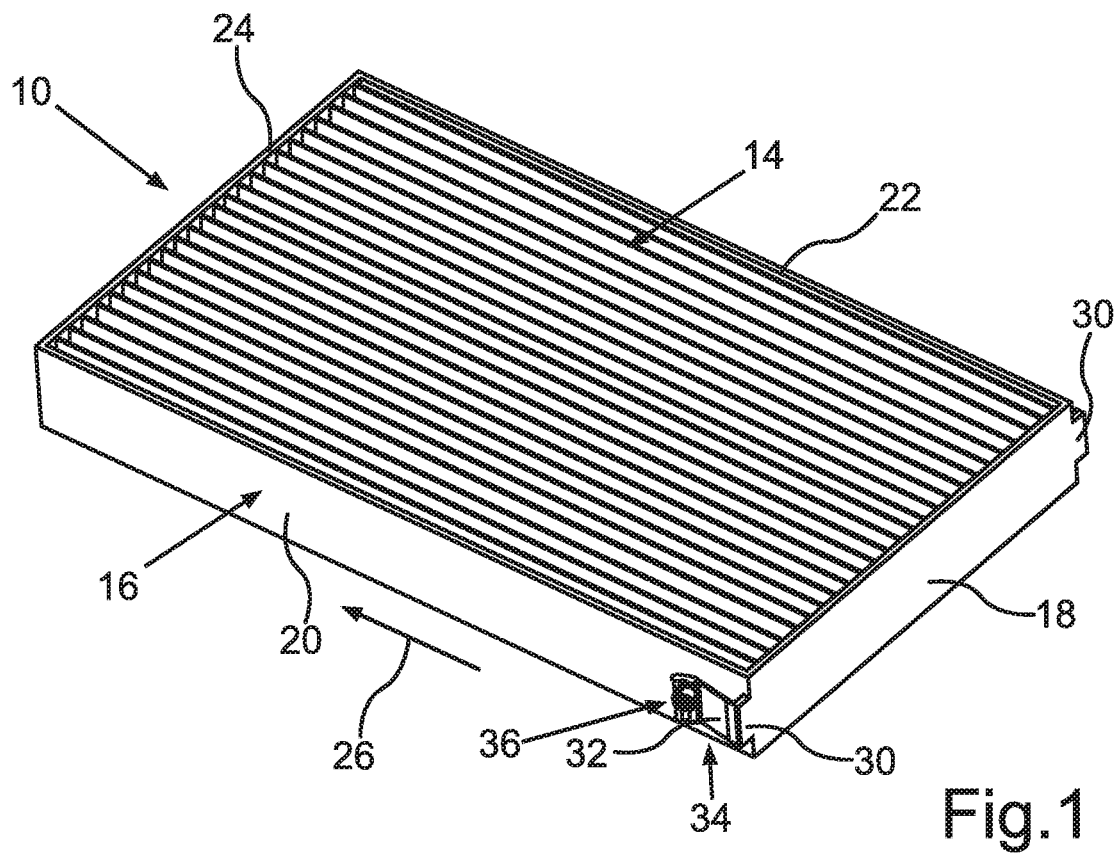
FIG. 1 shows a filter element for an air filter of a climate control system of a motor vehicle in perspective, wherein flexible holding elements are arranged on a frame of the filter element.

FIG. 1 shows a filter element 10 in perspective, as intended for installation in a housing 12 (compare FIG. 2) of an air filter or climate control system of a motor vehicle. A filter material 14 of the filter element 10 is configured by way of example as a pleated filter here. The filter material 14 is surrounded peripherally by a frame part 16, which comprises a front end wall 18, side walls 20, 22 adjoining the front end wall 18 and a rear end wall 24. The side walls 20, 22 extend in an insertion direction 26, which is indicated by an arrow in FIG. 1. The filter element 10 can be introduced or inserted in this insertion direction 26 into a receiving space 28, which is provided by the housing 12 (compare FIG. 2). Particularly when viewed in the insertion direction 26, the end wall more proximal to the observer in FIG. 1 is the front end wall 18 of the filter element 10, whereas the end wall 24 more distal to the observer is the rear end wall 24 of the filter element 10.

Figure 4:
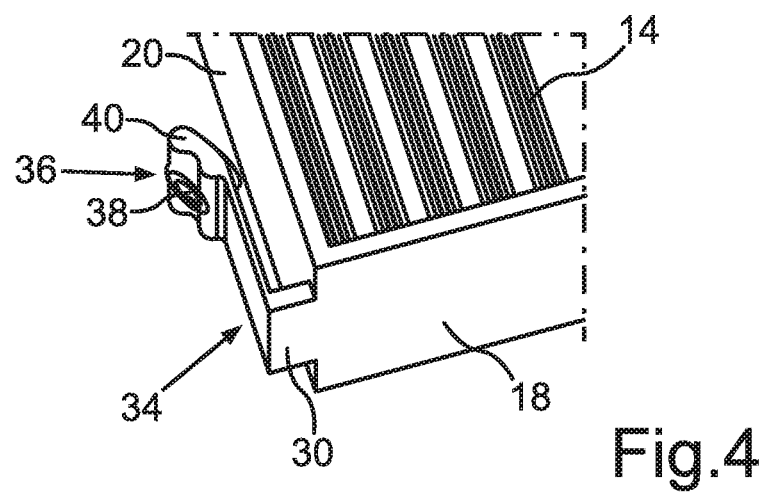
FIG. 4 shows a portion of the filter element according to FIG. 1 in an enlarged, detailed view.

An extension 30 which is flush with the front end wall 18 in the insertion direction 26, which is preferably formed integrally with the frame part 16 and which is shown enlarged in FIG. 4, is arranged on the each side wall 20, 22. In the plane of the end wall 18, the extension 30 projects beyond the side wall 20, 22. A wall thickness of the extension 30 can in particular correspond substantially to the wall thickness of the front end wall 18. A tab 32 extends in the insertion direction 26 from this extension 30 substantially parallel to the respective side walls 20, 22. The tab 32 has a lesser wall thickness than the extension 30. A flexible connecting strip 34 in the manner of a film hinge, on which a holding element 36 is held, is provided by the extension 30 and the tab 32.

In the variant of the filter element 10 shown by way of example in FIG. 1, the holding element 36 has a female thread 38, which is formed in a thickened (i.e., having an enlarged wall thickness) end region 40 of the connecting strip 34. In other words, the holding element 36 is fastened to the frame part 16 or to the filter frame by a film hinge. Accordingly, the holding element 36 is configured to be flexible, owing to the lesser wall thickness of the tab 32. The holding element 36 can thus be moved from an initial position shown in FIG. 1 into a functional position shown in FIG. 9. In this functional position, according to FIG. 9 and FIG. 10 a shaft 42 of a screw 44 can be screwed into the female thread 38, which is formed in the end region 40. For this purpose, the shaft 42 of the screw 44 likewise has a screw thread 46 (compare FIG. 9).

Figure 2:
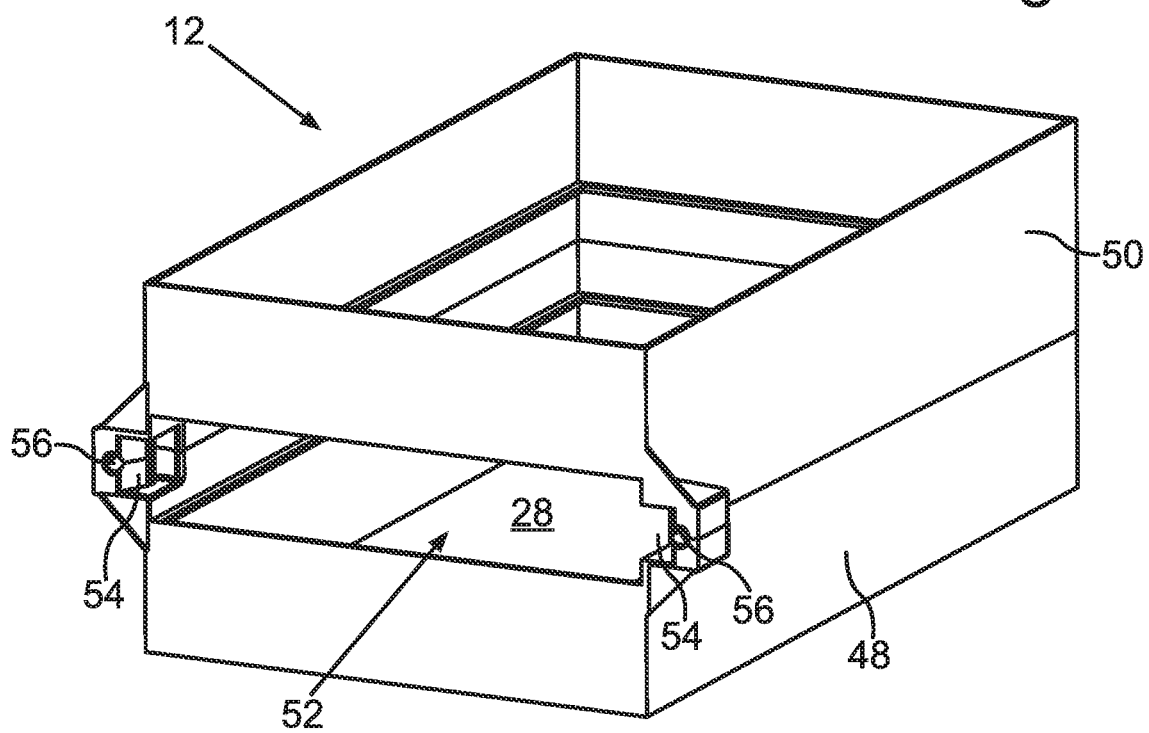
FIG. 2 shows a housing of the air filter in perspective, by which a receiving space is provided for the filter element according to FIG. 1.

It is evident from FIG. 2 that the housing 12 can comprise a housing bottom part 48 and a housing top part 50, by which an insertion opening 52 of the receiving space 28 is peripherally delimited. Guide mechanisms or guide tracks 54, in which the connecting strip 34 can be guided in the insertion direction 26, are provided by the housing bottom part 48 or a similar bottom shell and by the housing top part 50 or a similar top shell. Furthermore, respective passage openings 56 are formed in the housing 12 adjacent to the guide tracks 54. The shaft 42 of the screw 44 (compare FIG. 9) can protrude through these passage openings 56 in such a way that the screw thread 46, which is formed on the shaft 42, can be screwed into the screw thread 38 configured as a female thread, which is provided on sides of the filter element 10.

Figure 3:
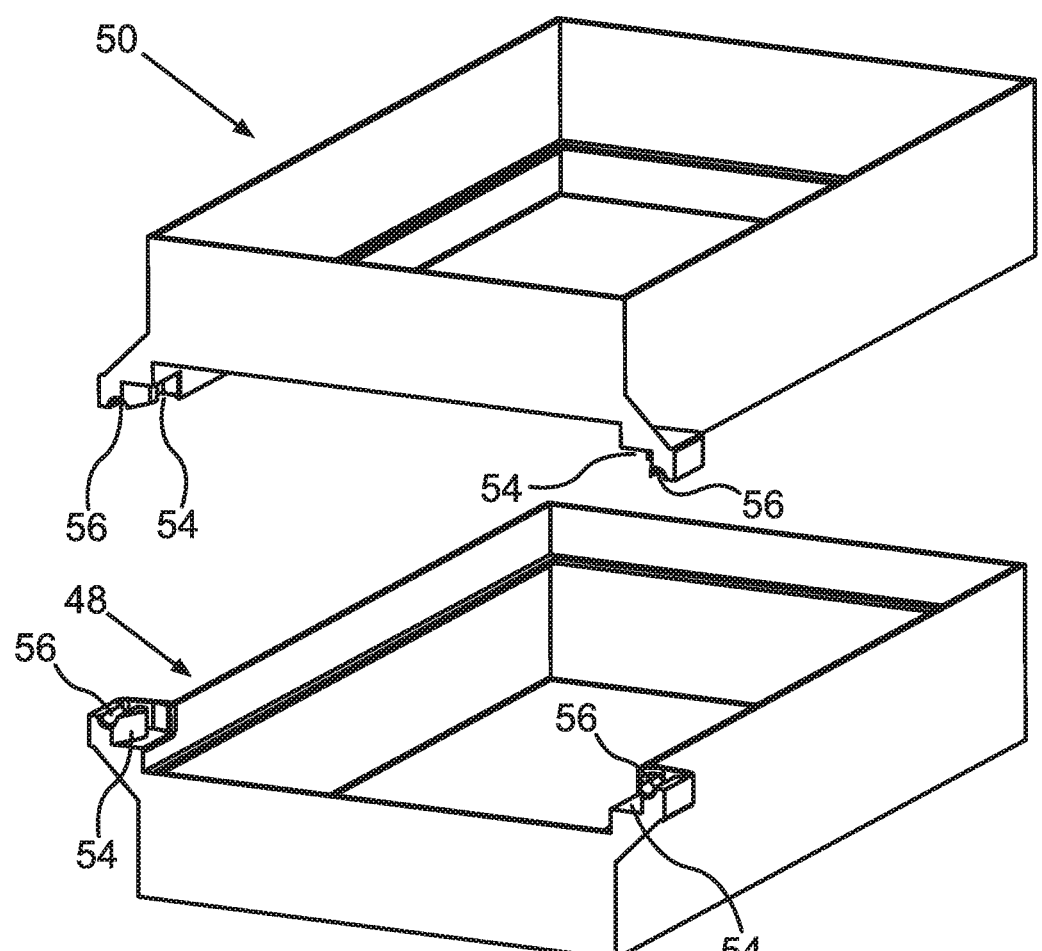
FIG. 3 shows two housing halves in perspective, from which the housing shown in FIG. 2 is assembled.

It is evident from the view in FIG. 3 that one half of each of the passage openings 56 and the guide tracks 54 is provided by the housing bottom part 48 and the other half thereof is provided by the housing top part 50. However, the housing 12 can also be formed in one piece in variants of the air filter.

Figure 5:
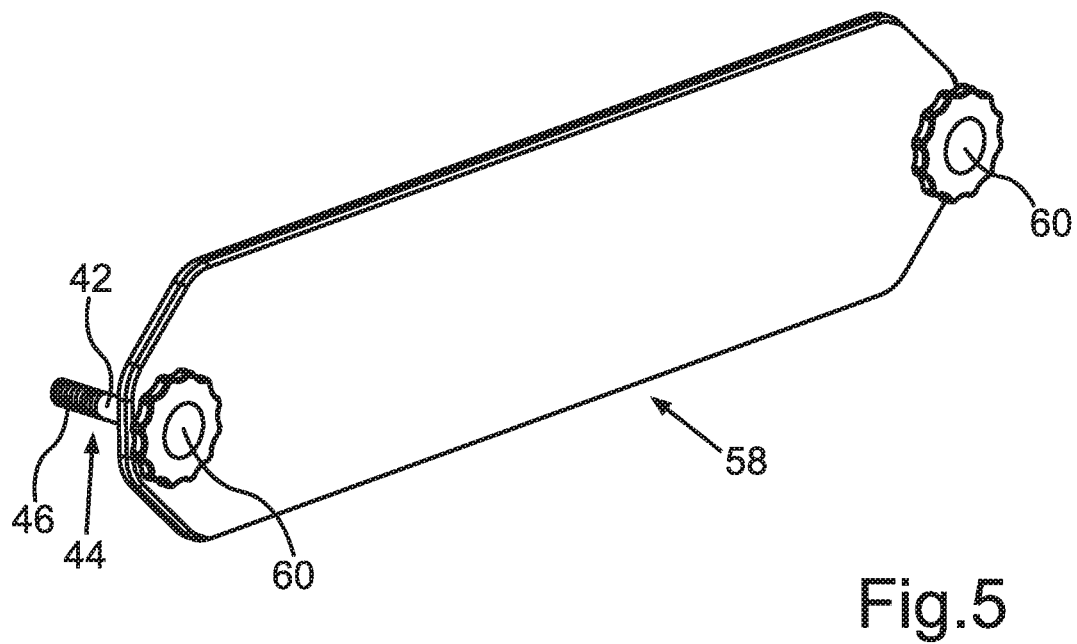
FIG. 5 shows a cover element for closing an insertion opening of the receiving space for the filter element according to FIG. 1, in a first perspective view.

FIG. 5 shows a cover element or a cover 58 in perspective, by means of which the insertion opening 52 of the housing 12 can be closed. However, in this case the holding elements 36, which are provided by the filter element 10, are needed for securing the cover 58 to the housing 12. In the variants of the air filter shown in FIG. 5 to FIG. 10, the cover 58 has passage openings in respective lateral edge regions through which the respective shafts 42 of the two screws 44 are guided. For turning the screws 44, a (for example, manually actuatable) handle part 60 can be provided on the screws 44. In the present case, the handle part 60 is configured in the manner of a hand wheel.

Figure 6:
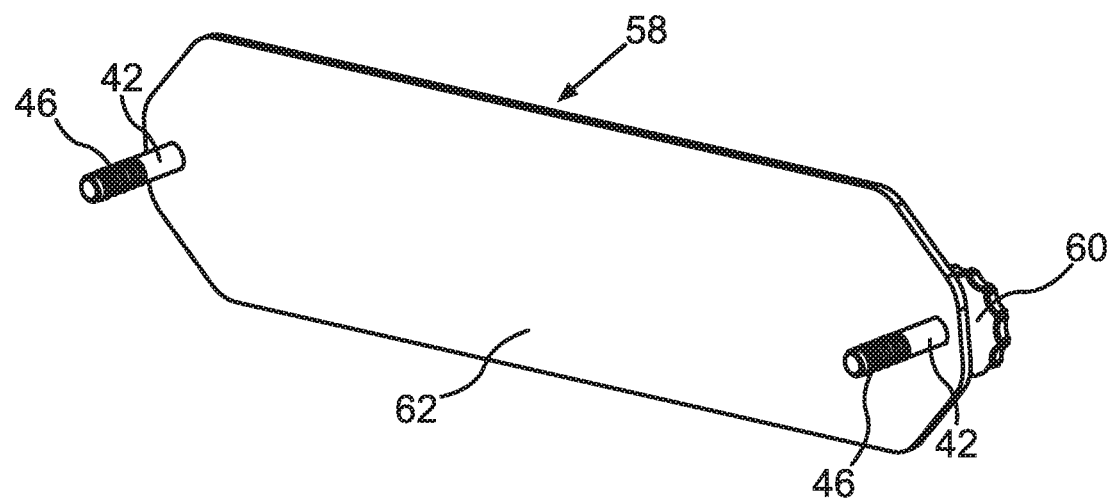
FIG. 6 shows the cover element according to FIG. 5, in a further perspective view.

It is evident from the view in FIG. 6 how the respective shafts 42 of the screws 44 are rotatably received in a base body 62 of the cover 58.

Figure 7:
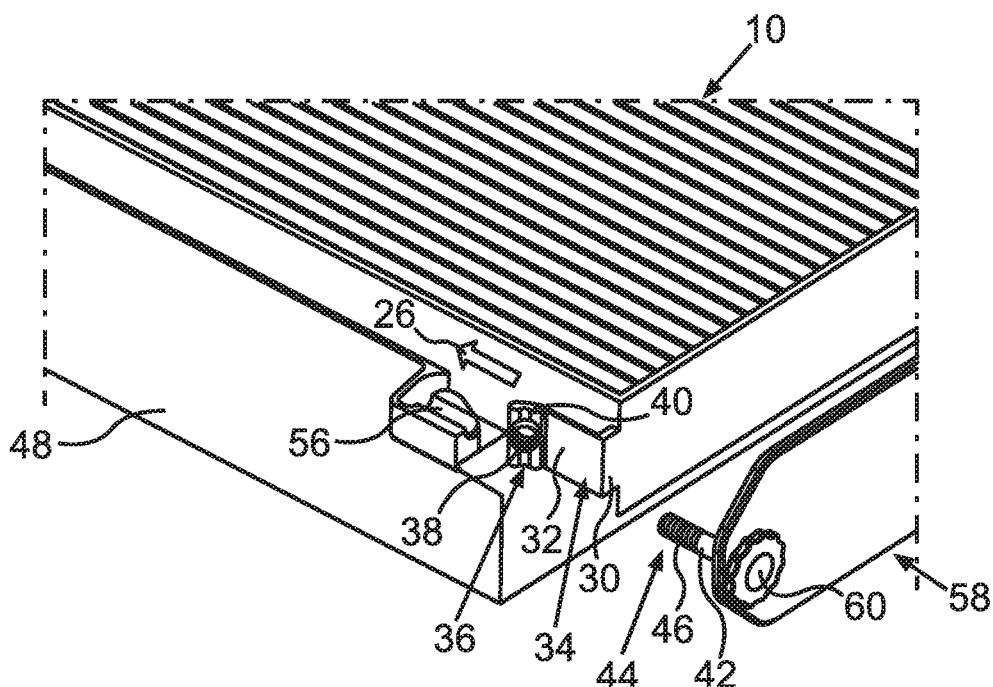
FIG. 7 shows a first step in the introduction of the filter element according to FIG. 1 into the housing according to FIG. 2, in which only a housing bottom part of the housing according to FIG. 2 is shown.

FIG. 7 to FIG. 10 illustrate a sequence of steps in the assembly of the filter element 10 and of the cover 58. FIG. 7 illustrates a first step of introducing the filter element 10 into the housing 12, wherein only the housing bottom part 48 is shown for the sake of clarity. The insertion direction 26 is indicated again by the arrow. In FIG. 7 and in FIG. 8, the end region 40, and with the latter the holding element 36 having the female thread 38, is still in its initial position (compare FIG. 4), in which the screw thread 46 of the screw 44 cannot yet be introduced into the female thread 38 of the holding element 36.

Figure 8:
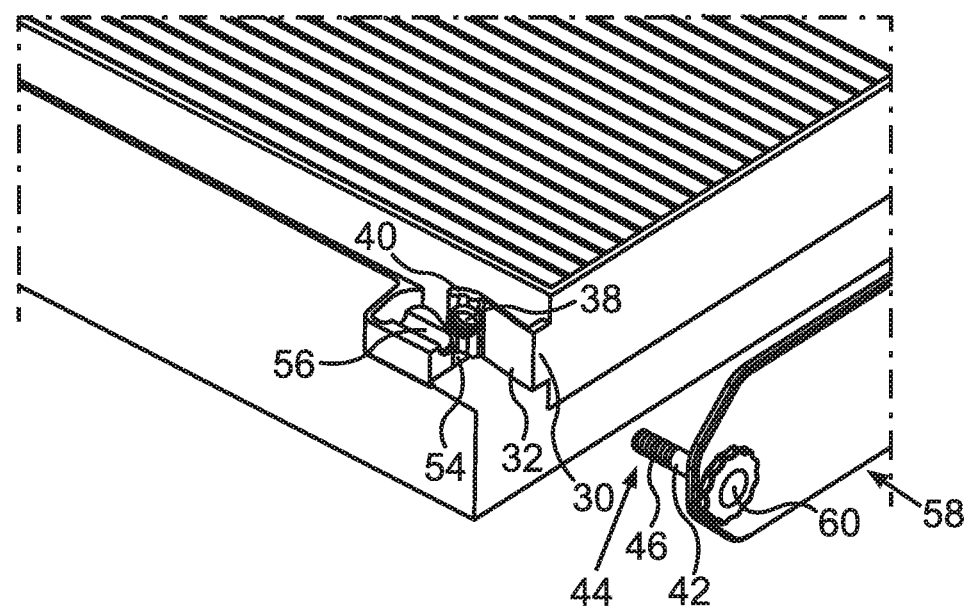
FIG. 8 shows a further step during the installation or during the introduction of the filter element into the housing.

FIG. 8 illustrates the state during the further introduction of the filter element 10, wherein the end region 40 enters the guide track 54. Accordingly, the holding element 36 or fastening element abuts on the guide track 54.

Figure 9:
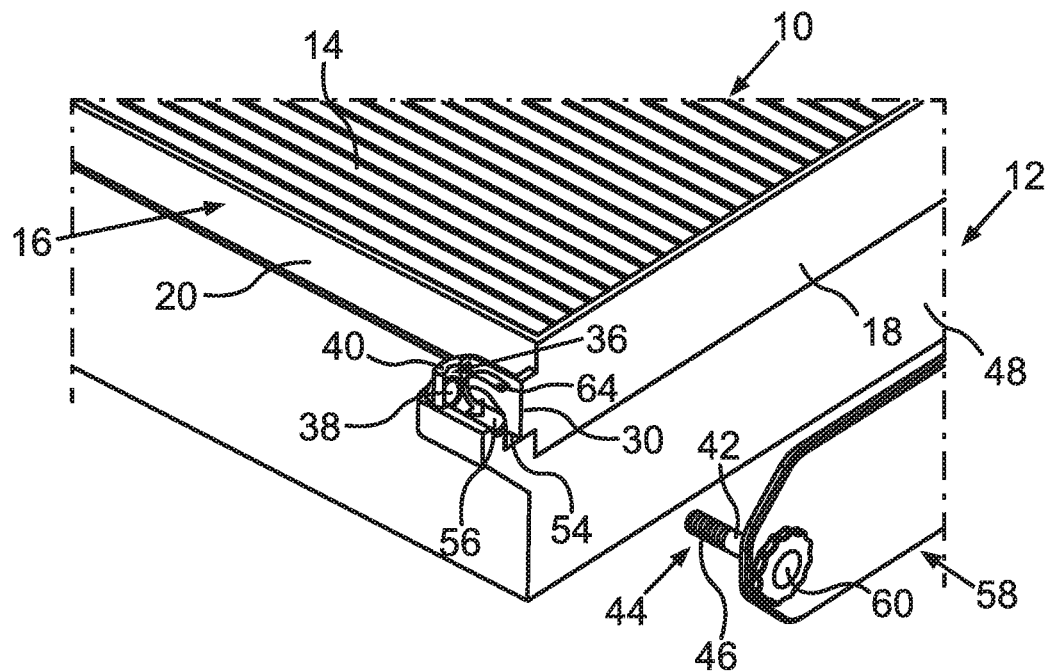
FIG. 9 shows the filter element according to FIG. 1 in its final position or end position in the housing according to FIG. 2, wherein a female thread held on a frame by a film hinge is brought into a functional position in which a screw arranged on the cover element can be screwed into the female thread.

FIG. 9 shows in a subsequent step how the end region 40 with the female thread 38 is deflected by the curved shape of the guide track 54, which in this case is delimited on one side by the side wall 20. This moving of the holding element 36 from the initial position shown in FIG. 4 into the functional position of the holding element 36 shown in FIG. 9 is indicated in FIG. 9 by another arrow 64.

Figure 10:
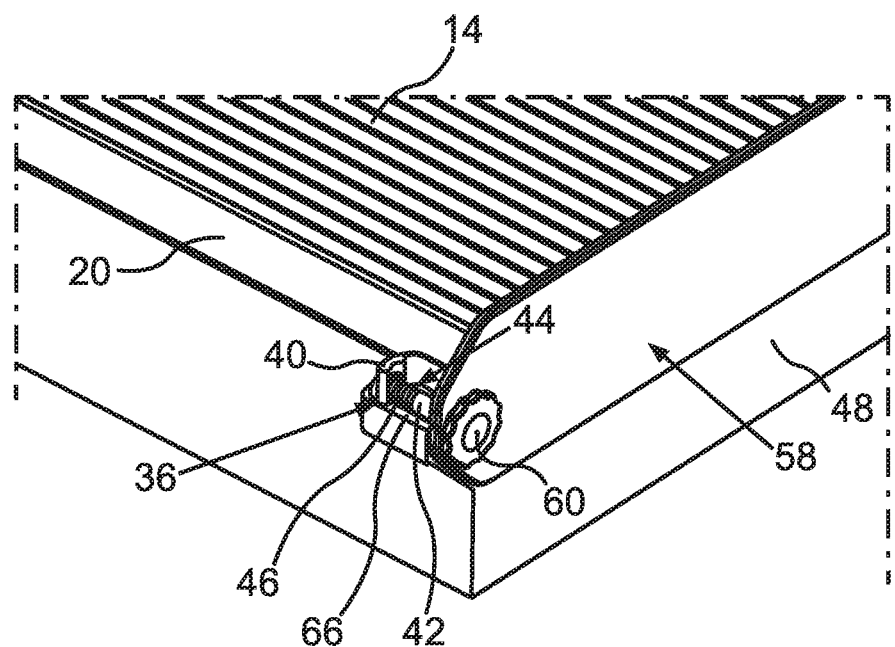
FIG. 10 shows the fastening of the cover element according to FIG. 5 to the housing according to FIG. 2 by screwing the screws arranged on the cover element into the female threads formed on the filter element.

Lastly, FIG. 10 shows how the screw 44 is screwed to the holding element 36 so that the cover 58 is secured to the housing 12. In the functional position of the holding element 36 shown in FIG. 9 and FIG. 10, the holding element 36 engages behind a housing part 66 of the housing 12 in which the passage opening 56 is formed.

In the dismantling for changing the filter element 10, first the screws 44 are loosened so that the cover 58 can be taken off of the housing 12, in other words removed from the insertion opening 52. The filter element 10 can then be pulled out of the receiving space 28 in a direction opposite the insertion direction 26. In doing so, the holding element 36 moves from the functional position (compare FIG. 9) back into the initial position (compare FIG. 4) because of the curved shape of the guide track 54.

Figure 11:
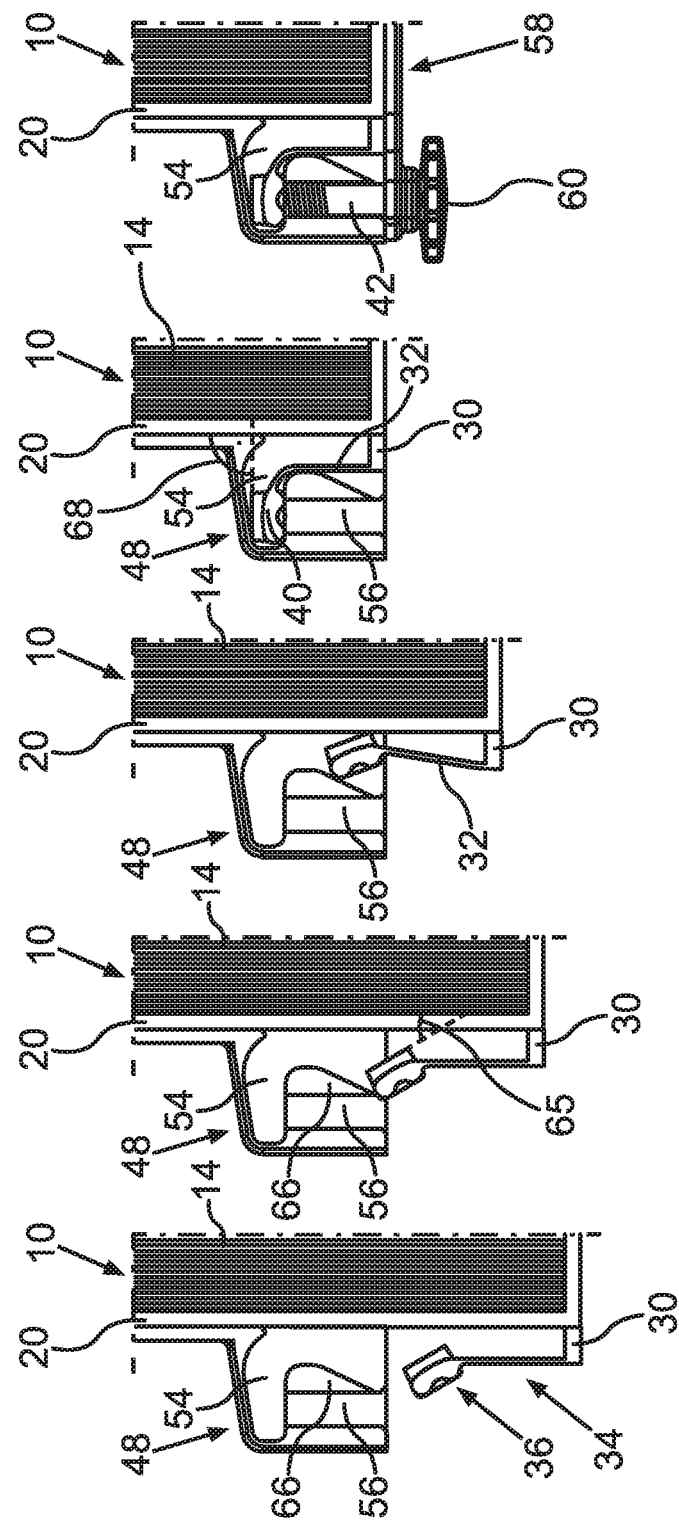
FIG. 11 shows in a view from above shown in sections from left to right, the steps during the moving of one of the holding elements from an initial position into the functional position, in which one of the screws can be screwed into the holding element.

The introduction or in-feeding of the connecting strip 34 into the guide track 54 is illustrated again with the aid of FIG. 11, this time in a view from above. From this illustration in particular it is evident that the holding element 36 in the initial position, in other words before the holding element 36 is introduced all the way into the guide track 54, forms an angle 65 with the side wall 20, which angle is less than 90 degrees, or even less than 45 degrees in the present case. A median plane of the holding element 36, which is perpendicular to a direction in which the shaft 42 of the screw 44 can be introduced into the screw thread 38, consequently forms the angle 65 with the side wall 20.

With the introduction of the connecting strip 34 into the guide track 54, the holding element 36 is initially moved closer to the side wall 20. In doing so, the tab 32 of the connecting strip 34 is elastically deformed near the projection or extension 30. As the connecting strip 34 penetrates further into the guide track 54, the holding element 36 is deflected by the guide track 54 such that the screw thread 38 configured as a female thread in the end region 40 aligns with the passage opening 56. In doing so, the tab 32 is elastically deformed near the end region 40. In this functional position, the holding element 36 is aligned substantially perpendicular to the side wall 20. Accordingly, the median plane running through the end region 40 forms a right angle 68 with the side wall 20. In this alignment of the holding element 36, the screw 44 can be screwed into the female thread 38, as shown in the last illustration of FIG. 11.

In the variant of the filter element 10 and of the housing 12 shown in sections in FIG. 12, of which again only the housing bottom part 48 is shown, provision is also made for a rotational locking of the cover 58 for securing the same to the housing 12. In the left illustration in FIG. 12, the fastening element provided on sides of the cover 58 is shown in the position in which the cover 58 is fixed to the housing 12 and in which accordingly the cover 58 closes the insertion opening 52. The holding element 36 is again brought into its functional position, in which it is arranged at the right angle 68 to the side wall 20 or assumes the right angle 68. However, in this variant, corresponding receptacles 70 for two pins 72, which stick out perpendicularly from the shaft 42 of the screw 44 or fastening screw, rather than a female thread are formed in the end region 40, which attaches to the flexibly or elastically deformable tab 32.

Figure 12:
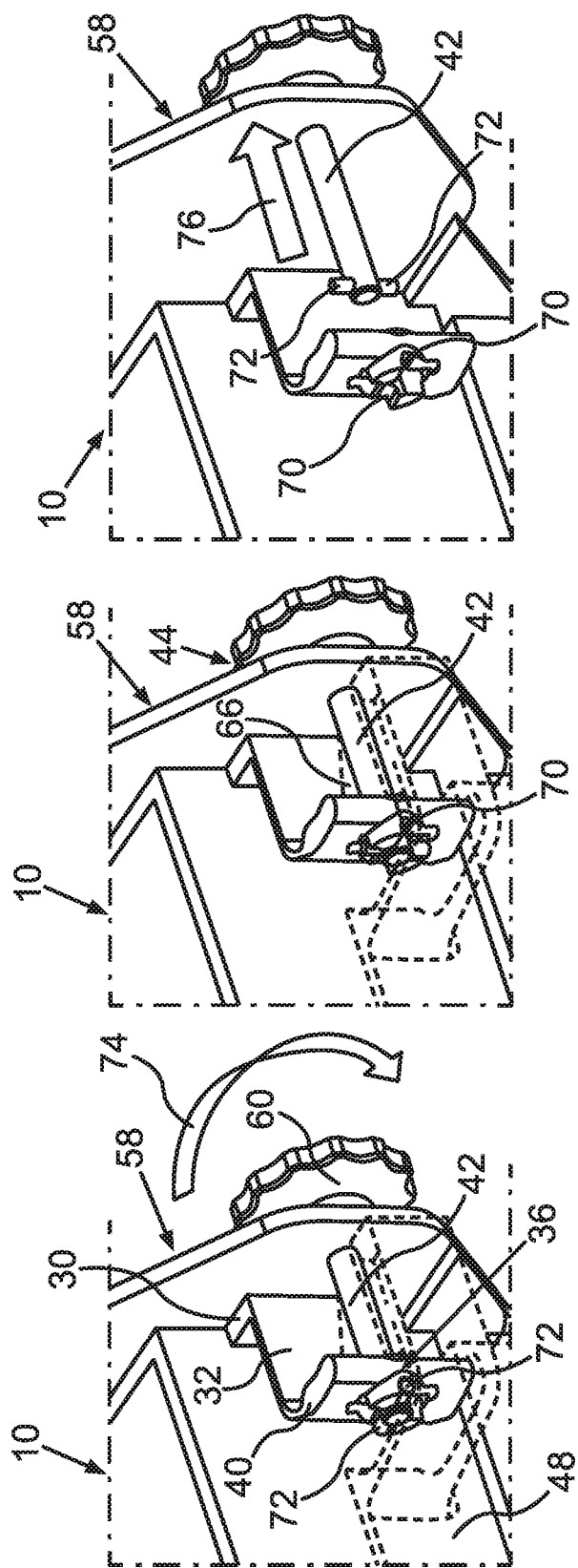
FIG. 12 shows a variant of the holding element formed on the filter element, wherein a rotational locking in the manner of a bayonet catch is made possible, and wherein the steps of dismantling the cover element from the housing are shown from left to right.

According to the left illustration in FIG. 12, the screw 44 is turned at the handle part 60, specifically in a direction indicated by another arrow 74 in FIG. 12. As a result, the pins 72 are moved out of their respective receptacles 70. According to the middle illustration in FIG. 12, an undercutting is eliminated. In other words, the pins 72 are no longer accommodated in their respective receptacles 70. In the present case, this is brought about by turning the shaft 42 or similar shaft part of the screw 44 serving as a fastening element a quarter turn.

The shaft 42 can then be pulled out from the holding element 36, the shaft 42 with the pins 72 being guided along the passage opening 56 which is formed in both the housing bottom part 48 and in the (not shown in FIG. 12) housing top part 50. Accordingly, the cover 58 no longer locks the filter element 10 and the cover 58 can be taken off. This removal of the cover 58 from the housing 12 is indicated by a further arrow 76 in the right illustration in FIG. 12.

Figure 13:
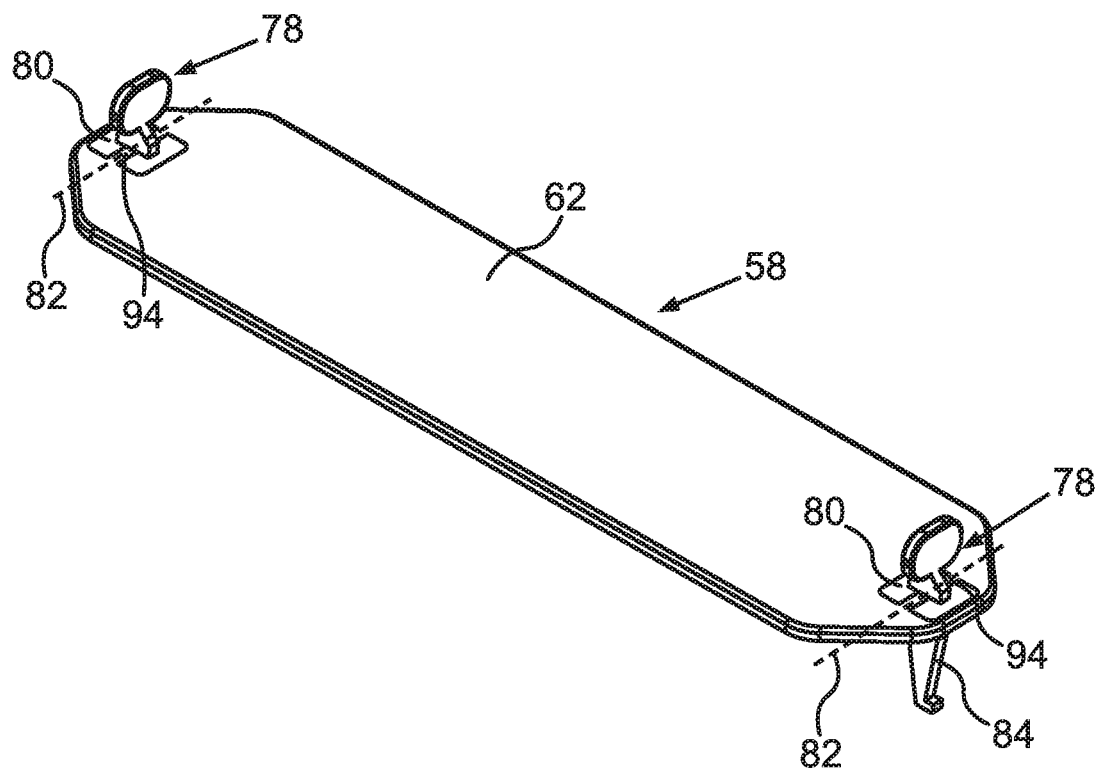
FIG. 13 shows a further, alternative cover element in a perspective view, in which provision is made for a translational locking by means of two catch clips.

FIG. 13 shows a further variant for fastening the cover 58. In this case, catch clips 78 rather than screws 44 are arranged in the base body 62 of the cover 58. Each catch clip 78, which enables a translational locking, is arranged within an elastomer seal 80, which is integrated in the base body 62. The elastomer seal 80 permits a pivoting or tilting of the individual catch clip 78 about a pivot axis 82, which is illustrated schematically in FIG. 13. The pivot axis 82 runs perpendicularly to a longitudinal extension direction of a shaft part 84 of the individual catch clip 78 or toggle lever.

Figure 14:
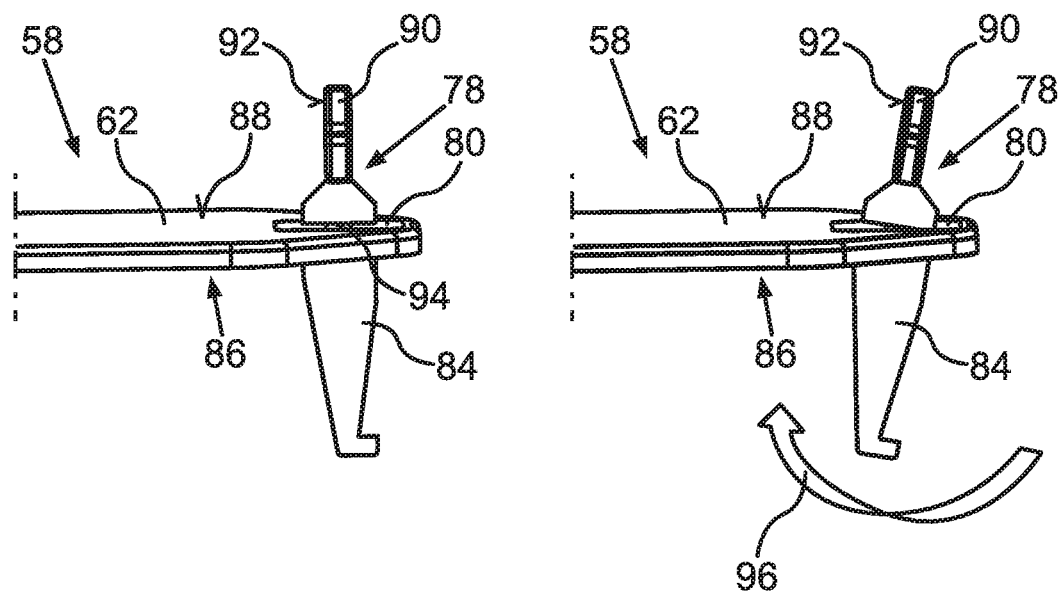
FIG. 14 a tilting of one of the catch clips into the dismantling position for releasing the cover element according to FIG. 13.

From FIG. 14 in particular it is evident that the shaft part 84 projects beyond a first side 86 of the base body 62. The first side 86 of the base body 62 of the cover 58 faces the filter element 10 if the cover 58 is mounted on the housing 12 in order to close the insertion opening 52 of the receiving space 28. A part of the catch clip 78 configured as an operating element 90 projects beyond an opposite side 88 of the base body 62. The catch clip 78 can be pivoted about the pivot axis 82 by pressing on a surface 92 of the operating element 90. The catch clip 78 is connected to the base body 62 of the cover 58 by strips 94 extending in the area of the pivot axis 82. The elastomer seal 80 borders the strips 94, on both sides of the strips 94.

In the illustration shown on the right in FIG. 14, the catch clip 78 is actuated and accordingly pivoted about the pivot axis 82. In doing so, the strips 94 twist and the elastomer seal 80 yields. In the right illustration of FIG. 14, an arrow 96 indicates the pivot movement of the actuated catch clip 78 about the pivot axis 82.

With the aid of FIG. 15, it is shown how the cover 58 according to FIG. 13 can be detached or dismantled from the housing 12. Again only the housing bottom part 48 of the housing 12 is shown. In the left illustration in FIG. 15, a latching lug 98, which is formed on an end of the shaft part 84 opposite the operating element 90, is hooked into a latching lug 100, which is formed on the holding element 36 of the filter element 10 when the holding element is brought into its functional position. An end region of the shaft part 84, in which the latching lug 98 is formed, passes through a passage opening formed in the holding element 36. As in the variants of the filter element 10 described in the preceding, the holding element 36 in the functional position is aligned substantially perpendicularly to the side wall 20.

By pressing on the operating element 90 in a direction indicated by an arrow 102 in the center illustration of FIG. 15, the catch elements or latching lugs 98, 100 are brought out of engagement. In other words, the catch element in the form of the latching lug 98 provided on sides of the cover 58 is no longer in undercutting engagement. The shaft element or shaft part 84 with its latching lug 98 can then be fed through the passage opening 56, which is formed in the housing 12 by the housing bottom part 48 and the (not shown in FIG. 15) housing top part 50. Accordingly, the cover 58 can then be removed from the housing 12. The cover 58 is thus no longer blocking or locking the filter element 10. After the cover 58 has been removed from the housing 12, the filter element 10 can then be removed. In doing so, the holding element 36 moves (following the curved contour of the guide track 54 bordered on one side by the side wall 20) from the functional position shown in FIG. 15 back into the initial position. The holding element 36 reaches the initial position once the holding element 36 has left the guide track 54.

In each of the different variants, flexible holding elements 36 or fastening elements provided by, say, film hinges are thus mounted on the filter element 10 configured as a replacement part, which elements align to the guide track 54 as they are introduced into the housing 12 and encompass, in an undercutting manner, the housing part 66 in which the passage opening is formed in the end position. A check as to whether the filter element 10 was installed takes place simultaneously, as a fastening of the cover 58 is not possible without the filter element 10 having been inserted first. In other words, the cover 58 can only be fastened to the housing 12 with the filter element 10 inserted or installed in the housing 12.

The invention claimed is:

1. A filter element for an air filter of a motor vehicle, comprising:
a frame part (16);
a filter material (14), wherein the frame part (16) surrounds, at least in regions, the filter material (14);
wherein the filter element (10) is insertable into a receiving space (28) of a housing (12) of the air filter; and
a holding element (36), wherein the holding element (36) is fastened to the frame part (16) by a flexible connecting strip (34) and wherein the holding element (36) is movable, by inserting the filter element (10) in the receiving space (28), from an initial position into a functional position in which a fastening element (44, 78), which is configured for securing a cover element (58) used to close an insertion opening (52) of the receiving space (28) to the housing (12), is fixable to the holding element (36).

2. The filter element according to claim 1, wherein the holding element (36) is movable from the initial position into the functional position by a deformation of the flexible connecting strip (34).

3. The filter element according to claim 2, wherein the holding element (36) in the initial position forms a first angle (65) with a side wall (20, 22) of the frame part (16), which side wall extends in an insertion direction (26) of the filter element (10) in which the filter element (10) is insertable into the receiving space (28) and wherein the holding element (36) in the functional position forms a second angle (68) with the side wall (20, 22) which is larger than the first angle (65).

4. The filter element according to claim 3, wherein the holding element (36) in the functional position is aligned substantially perpendicular to the side wall (20, 22).

5. The filter element according to claim 1, wherein the holding element (36) has a female thread (38).

6. The filter element according to claim 1, wherein the holding element (36) has a receptacle (70) for a pin (72) formed on the fastening element (44, 78).

7. The filter element according to claim 1, wherein the holding element (36) has a catch element (100) for a corresponding catch element (98) of the fastening element (44, 78).

8. An air filter for a motor vehicle, comprising:
the filter element (10) according to claim 1, wherein the filter element (10) is introduced into a receiving space (28) of a housing (12) of the air filter;
wherein a cover element (58) is secured to the housing (12) by fixing a fastening element (44, 78) to the holding element (36) of the filter element (10) and wherein an insertion opening (52) of the receiving space (28) is closed by the cover element (58).

9. The air filter according to claim 8, wherein the cover element (58) is configured as a separate closure mechanism for the receiving space (28) which is removable from the insertion opening (52) before taking the filter element (10) out of the receiving space (28).

10. The air filter according to claim 8, wherein the housing (12) has a guide mechanism (54), wherein the holding element (36) is movable from the initial position into the functional position by introducing the holding element (36) into the one guide mechanism (54).

11. The air filter according to claim 8, wherein the holding element (36) in the functional position engages behind a housing part (66) of the housing (12), wherein a passage opening (56) is formed in the housing part (66), and wherein a shaft part (42, 84) of the fastening element (44, 78) is guided through the passage opening (56) if the fastening element (44, 78) is fixed to the holding element (36).

12. The air filter according to claim 11, wherein the shaft part (42, 84) has a screw thread (46) and/or a pin (72) introducible into a receptacle (70) by turning the shaft part (42, 84).

13. The air filter according to claim 11, wherein the shaft part (42, 84) is pivotable about a pivot axis (82) extending perpendicularly to a longitudinal extension direction of the shaft part (42, 84) and wherein by pivoting the shaft part (42, 84) about the pivot axis (82), the fastening element (44, 78) is movable into a release position in which fixation of the fastening element (44, 78) to the holding element (36) is disengaged.

* * * * *